Sept. 25, 1945.  R. H. MITCHELL ET AL  2,385,637
DISK HARROW
Filed Dec. 2, 1943  3 Sheets-Sheet 1

INVENTORS
R.H. MITCHELL
T.M. THOMAS
BY
ATTORNEYS

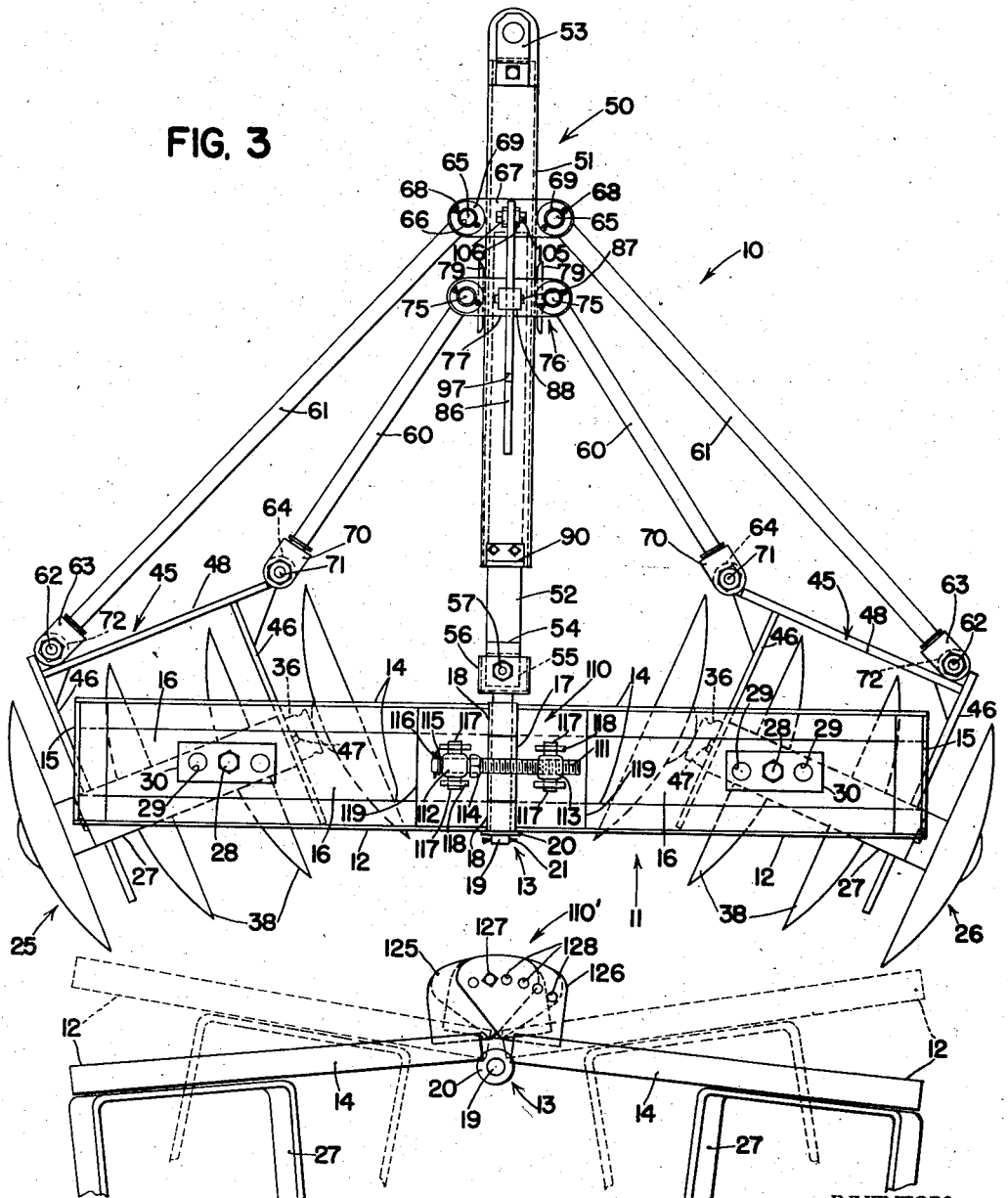

Sept. 25, 1945.　　　R. H. MITCHELL ET AL　　　2,385,637
DISK HARROW
Filed Dec. 2, 1943　　　3 Sheets-Sheet 3

INVENTORS
R. H. MITCHELL
T. M. THOMAS
BY
ATTORNEYS

Patented Sept. 25, 1945

2,385,637

UNITED STATES PATENT OFFICE 2,385,637

DISK HARROW

Rollie H. Mitchell and Thomas M. Thomas, Huntington Park, Calif., assignors to Killefer Manufacturing Corporation, Los Angeles, Calif., a corporation of California Application December 2, 1943, Serial No. 512,656

9 Claims. (Cl. 55—81)

The present invention relates generally to disk harrows and has for its principal object the provision of a tractor operated single acting harrow which is simple in construction and inexpensive in manufacture but is adjustable to many different conditions of operation and can be quickly and easily converted to several different types of operations.

One feature of the present invention relates to the provision of a disk harrow which can be readily converted for operation in which the soil is thrown outwardly away from the center line of the harrow or for operation in which the soil is thrown inwardly toward the center line of the harrow. A further feature relates to means for laterally adjusting the spacing between the right and left hand gangs of the harrow. Another feature relates to the provision for tilting the axes of the disk gangs in a transverse vertical plane. The two gangs are mounted on a pair of transversely aligned frame sections which are hinged together at the center for vertical movement about a fore and aft extending axis. With the axes of the gangs in a common horizontal plane, the harrow can be used for ordinary tillage purposes with the disks set to throw the soil either inwardly or outwardly. The harrow can be used to form ditches for irrigation purposes and the like by setting the disks to throw outwardly and adjusting the harrow frame so that the axes of the disks are inclined upwardly and outwardly from the center. Ridges, borders, or beds can be formed by setting the disks to throw the soil inwardly toward the center of the harrow and adjusting the frame about the center hinge so that the axes of the disks are inclined outwardly and downwardly. The width of the ridges or borders can be adjusted by shifting the gangs inwardly or outwardly on the frame.

A further feature of this invention relates to the provision of a simple draft mechanism by means of which the harrow can be angled between transport position and working position by the draft force of the tractor, with the disks set in any of the above-mentioned positions.

These and other objects and advantages of the present invention will be apparent to those skilled in the art after a consideration of the following description, in which reference is had to the drawings appended hereto, in which Figure 1 is a plan view of a harrow embodying the principles of the present invention, with the disks set to throw the soil outwardly from the center line of the harrow, showing in solid lines the gangs in their transversely aligned transport position, and showing in dotted lines the gangs angled into their working position.

Figure 3 is a plan view of the harrow with the gangs positioned to throw the dirt inwardly as when making borders or ridges, with the gangs angled in working position.

Figure 4 is a partial rear elevational view showing in solid lines a pair of frame sections in downwardly and outwardly inclined positions, as when used for making ridges, and in dotted lines the frame sections are shown in upwardly and outwardly inclined positions, as when forming ditches, the frame securing means being shown as a modified form.

Figure 1:
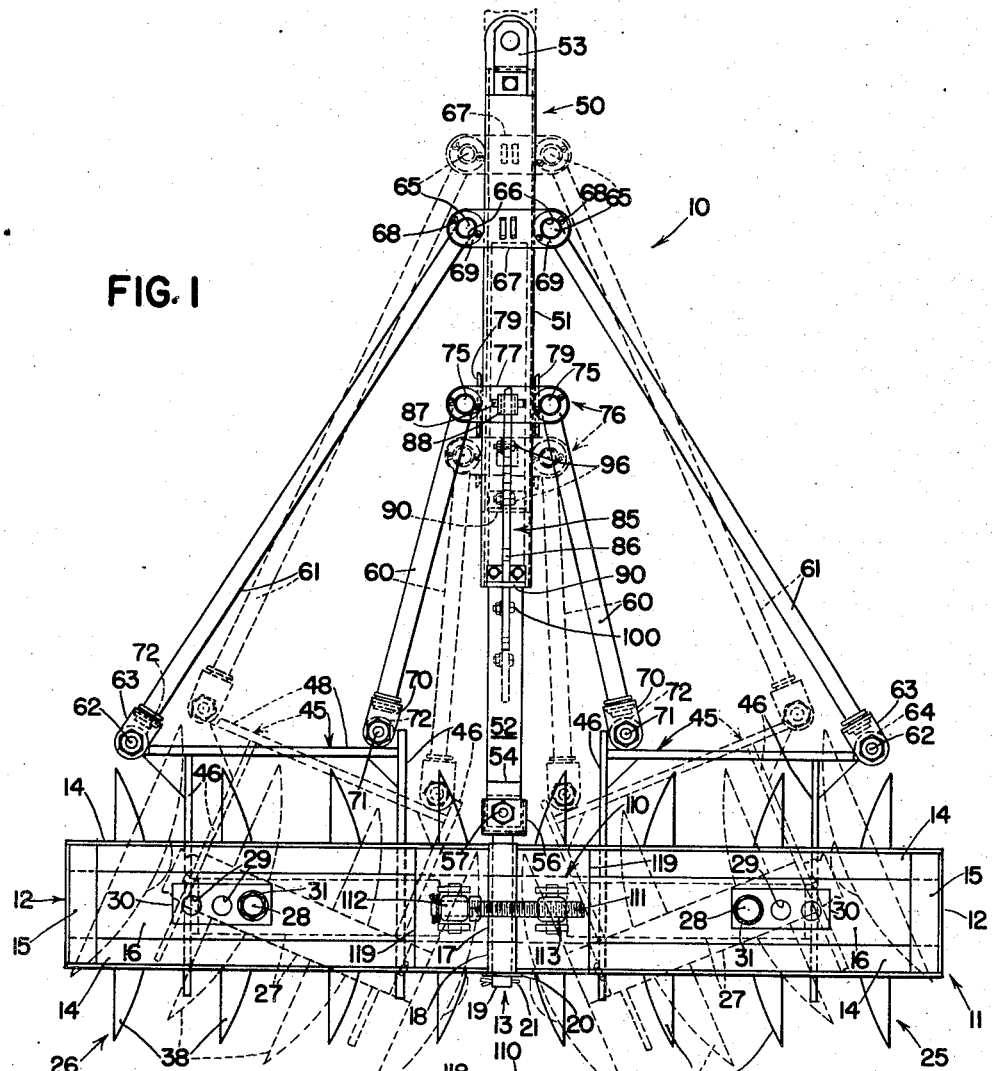

Referring now to the drawings, the disk harrow is indicated in its entirety by reference numeral 10 and comprises a transverse frame 11 composed of a pair of laterally aligned frame sections 12 swingably connected together at their inner or adjacent ends by a hinge device 13 providing for relative vertical angular movement about a fore and aft extending axis but preventing relative horizontal angular movement. Each of the gang sections 12 comprises front and rear transverse structural angle frame members 14, the outer ends of which are interconnected by fore and aft extending structural angle members 15, rigidly secured thereto as by welding. Each of the structural angle members 14, 15 is positioned with the vertical flanges on the outside and the horizontal flanges extending inwardly therefrom and a horizontal bottom plate 16 is provided within each of the frame sections in the plane of the horizontal flanges of the angle members 14, 15, thus providing a rigid frame section in the form of a tray, rigidly welded together, which may be used to hold weights when operating in hard soil, as is well-known to those skilled in the art.

The hinge device 13 comprises a central tubular hinge member 17 rigidly welded to the inner end of one of the frame sections 12, and a pair of tubular hinge members 18 disposed in fore and aft alignment with the central member 17 and rigidly welded to the other of the frame sections 12. A hinge pin 19 is inserted rearwardly through the aligned tubular members 17, 18 and is secured therein by means of a washer 20 and cotter pin 21 on the rear end of the pin 19.

Figure 5:
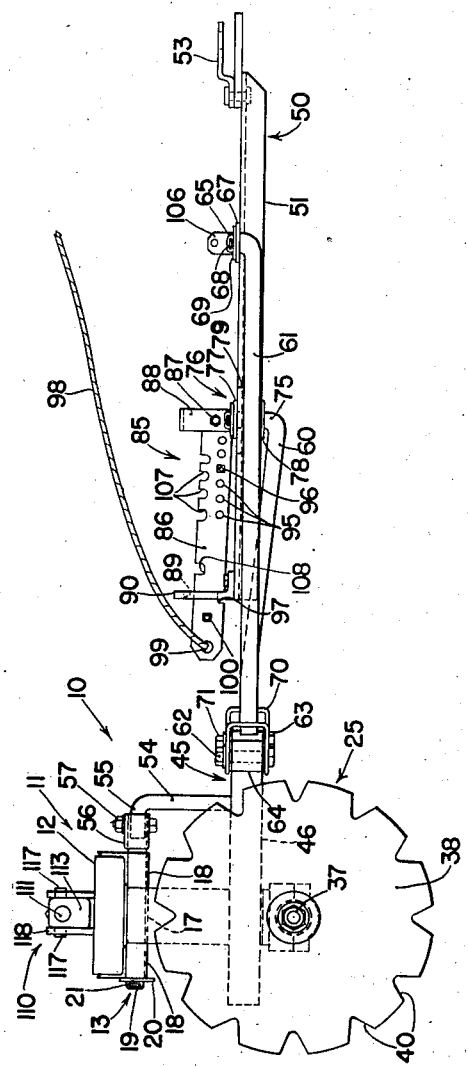
Figure 5 is a side elevational view of the harrow as viewed from the right in Figure 1.
Figure 6:
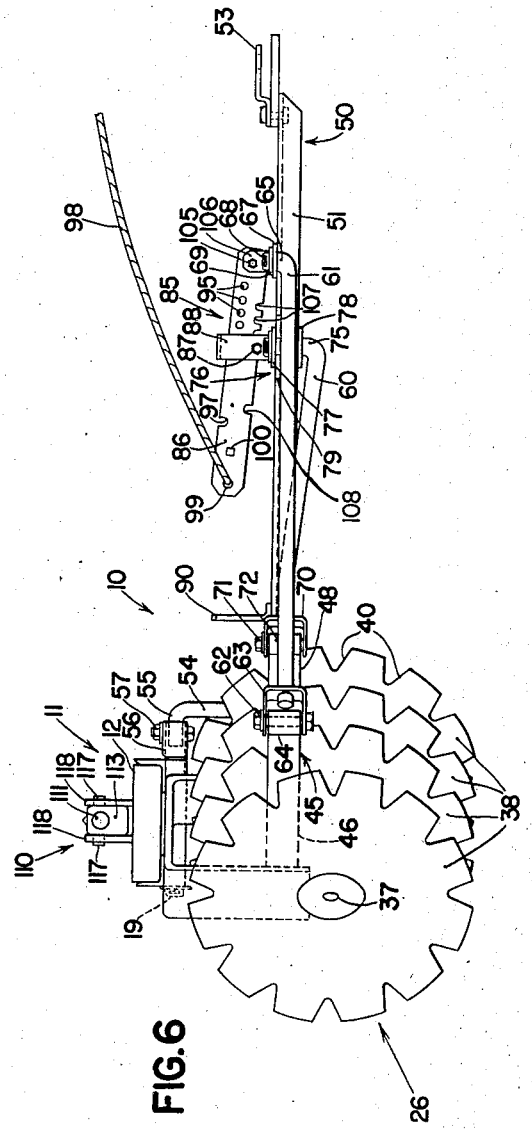
Figure 6 is a side elevational view of the harrow as viewed from the right in Figure 3.

A pair of right and left hand gangs 25, 26 are mounted on the frame sections 12, respectively. Each of the gangs 25, 26 comprises a supporting frame 27 consisting of an inverted U-shaped bar, the central portion of which lies against the bottom of the plate 16 and is pivotally connected thereto by means of a vertically disposed pivot stud 28 welded to the frame bar 27 and extending upwardly through one of a row of laterally spaced holes 29 in the frame plate 16. A reenforcing plate 30 is welded on top of the plate 16 and provided with holes 29 in alignment with those in the plate 16. A nut 31 is engaged with the threaded upper end of the stud 28. The lower ends of the U-shaped frame bars 27 are turned laterally at 35 and are mounted on top of journal bearings 36, each pair of which carries a gang bolt 37. A plurality of concavo-convex ground working disks 38 are mounted on each gang bolt 37 in axially spaced relation, the spacing of which is maintained by spacing spools 39 in the usual manner. The disks 38 are provided with notches 40 extending inwardly from the cutting edges thereof, as shown in Figures 5 and 6, although the notches may be omitted if desired.

Each disk gang is provided with a draft frame 45 comprising a pair of forwardly extending bars 46 connected by bolts 47 to the lower ends of the U-shaped frame members 27 and interconnected at their forward ends by a transverse bar 48, rigidly fixed thereto as by welding.

Draft is applied to propel the harrow by means of a longitudinally extending draft tongue 50 comprising forward and rear telescopically related sections 51, 52, the latter being in the form of a solid bar extending forwardly through the forward section 51 which is hollow and slidably shiftable relative thereto. A hitch device 53 is provided on the forward end of the forward section 51 and is adapted to be coupled by any suitable means to the drawbar of a tractor or the like. The rear end of the rear section 52 is bent upwardly at 54 and has an upper end 55, which is turned rearwardly and is received within a socket member 56, which is welded on the forward end of the hinge pin 19. A bolt 57 passes vertically through aligned openings in the socket member 56 and end portion 55 and couples the same rigidly together. Thus, the rear end of the draft tongue 50 is supported on the hinge pin 19 at its rear end and on the drawbar of the tractor (not shown) at its front end.

The draft frames 45 of the disk gangs 25, 26 are coupled to the forward section 51 of the draft tongue 50 by means of two pairs of inner and outer draft links 60, 61. Each of the outer draft links 61 is pivotally connected at its rear end by means of a bolt 62 to the outer end of the draft frame 45. The bolt 62 extends vertically through a U-shaped coupler 63, which is attached to the rear end of the link 61 and has upper and lower apertured portions adapted to receive a tubular bolt-receiving sleeve 64, the latter being welded to the transverse draft frame member 48. The upper and lower portions of the coupler 63 are apertured to align with the collar 64 to receive the bolt 62. The forward ends of the outer links 61 are bent upwardly at 65 and are inserted upwardly through apertures 66 in a plate 67 which extends transversely over the front tongue section 51 and beyond the side edges thereof, and the plate 67 is rigidly fixed, as by welding, to the tongue section 51. The ends 65 of the links 61 are supported from the plate 67 by means of cotter pins 68, which are inserted through transverse holes in the ends of the links 61. Washers 69 are placed over the ends 65 of the links beneath the cotter pins 68.

The inner links 60 are also provided with U-shaped couplers 70, which are swivellingly connected to the rear ends of the links 60 and are coupled by bolts 71 to vertical sleeves 72 fixed to the front draft frame bar 48. The forward ends of the links 60 are turned upwardly at 75 and are pivotally connected to a carriage 76 in the form of a pair of vertically spaced transverse plates 77, 78 disposed above and below the front draft tongue section 51, respectively, and which are interconnected by vertical plates 79 disposed on opposite sides of the tongue section 51 and rigidly welded to the upper and lower plates 77 and 78. The carriage 76 is slidable longitudinally along the tongue section 51 to permit shifting the inner links 60 fore and aft with respect to the tongue section 51, thereby angling the disk gangs 25, 26 about the vertical axes of the pivot bolts 28.

Referring now more particularly to Figures 1 and 5, wherein the disks are set to throw the soil outwardly, a forward movement of the tractor causes a forward shifting movement of the front tongue section 51 relative to the rear tongue section 52, thereby pulling the outer ends of the disk gangs forwardly through the outer links 61, while the inner ends of the gangs are allowed to shift rearwardly as the gangs pivot about the vertical axes of the pivot bolts 28. During this angling movement, the carriage 76 slides rearwardly but is arrested in its rearward movement by means of a latch mechanism indicated in its entirety by reference numeral 85 and comprising a bar 86 pivotally mounted by means of a pivot bolt 87 on a vertical bracket 88, which is rigidly fixed as by welding to the upper plate 77 of the carriage 76. The bracket 88 is in the form of an inverted U-shaped bar, adapted to straddle the pivoted bar 86, which extends rearwardly therefrom and through a vertical slot 89 in a bracket plate 90, the latter being fixed to the rear end of the forward tongue section 51 and disposed in a transverse vertical plane. The pivoted bar 86 is provided with a series of longitudinally spaced holes 95 adapted to receive a stop bolt 96, which can be inserted in any one of the holes 95 and secured tightly to the pivoted bar 86. When the gangs are angled, the tongue section 51 moves forwardly and the carriage 76 moves rearwardly until the stop bolt 96 engages the bracket plate 90, since it is too long to pass through the slot 89 in the plate 90. This limits further relative longitudinal movement between the tongue section 51 and the carriage 76 and thus determines the horizontal angle of operation between the axes of the disk gangs. This angle can be easily adjusted by shifting the stop bolt 96 to one of the other holes 95 in the pivoted bar 86.

The gangs are retained in transversely aligned position for transport purposes, by means of a notch 97 in the lower edge of the pivoted bar 86, which notch engages the lower end of the slot 89 in the plate 90 and prevents the carriage 77 from moving fore or aft along the draft tongue.

When it is desired to shift the harrow into angled position, the tractor is driven forwardly, and at the same time the pivoted bar 86 is raised about the pivot bolt 87 by means of a control rope 98, which is secured to an aperture 99 in the free end of the bar 86 and extends forwardly to a position within convenient reach of the tractor operator. A pull on the rope 98 lifts the notch 97 out of engagement with the bracket plate 90 and permits the carriage 76 to slide rearwardly along the tongue section 51, thereby sliding the bar 86 rearwardly through the slot 89 until the stop bolt 96 engages the plate 90, at which time the gangs are disposed in angled position as illustrated in dotted lines in Figure 1. During operation, the draft is transmitted entirely through the draft links 60, 61, for there is no draft connection between the two sections 51, 52 of the draft tongue 50. The purpose of the telescoping sections is to provide a support for the rear end of the draft tongue and to center the latter on the fore and aft extending center line of the harrow at all times.

To return the harrow to transport position, the tractor is merely backed against the draft tongue 50, causing the forward section 51 to slide rearwardly relative to the rear section 52 and also relative to the carriage 76, the latter sliding relatively forwardly along the draft tongue and sliding the pivoted bar 86 forwardly through the slot 89. The lower edge of the bar 86 slides forwardly on the lower end of the slot 89 until the notch 97 engages the plate 90, locking the harrow in transport position. A stop bolt 100 is disposed in a suitable aperture in the bar 86 rearwardly of the plate 90 to prevent the bar 86 from pulling out of the slot 89 in the event that the notch 97 does not securely engage the plate 90, during the shifting of the gangs back to transport position.

Referring now more particularly to Figures 3 and 6, when it is desired to operate the harrow with the disks throwing the soil inwardly toward the center line of the harrow, the draft links 60, 61 are disconnected from the gang frames 45 by removing the bolts 62, 71. The pivot bolts 28 are then removed and the gangs 25, 26 are interchanged, gang 25 now becoming the left hand gang and gang 26 being moved to the right side of the harrow, and pivotally mounted on the frame by means of the pivot bolts 28. Although in the position of Figure 1 in which the soil is thrown outwardly, the pivot bolts 28 are usually disposed in the two innermost holes 29 to position the two inner gang disks as closely together as possible, when the gangs are set in the position of Figure 3 by throwing the soil inwardly, the bolts 28 can be placed in any one of the holes 29 associated therewith, depending on the width of the ridge to be formed. The links 60, 61 are then reconnected to the draft frames 45 by replacing the bolts 62, 71 as indicated in Figure 3. Since in this position the inner ends of the gangs move forwardly when the harrow is angled into operating position, rather than rearwardly as in Figure 1, the locking bar 86 must be shifted to accommodate the new arrangement. Accordingly, the bolts 87, 96 and 100 are removed from the locking bar 86 and the latter is pivotally connected by a bolt 105 to a pair of vertically disposed lugs 106, which are suitably fixed, as by welding, to the top of the plate 67. Here again, in the normal position of the bar 86, the latter extends rearwardly from the pivot bracket 106, but in this case the bar 86 is inverted so that the notch 97 is now on the upper edge and is not used in controlling the harrow in this position of the gangs. The opposite edge of the bar 86, which is now the lower edge, is provided with a series of notches 107, which are adapted to be engaged selectively with the bolt 87, which is replaced in the bracket 88 and now serves as a detent over which the notches 107 can be engaged. Another notch 108 spaced toward the end of the bar 86, is adapted to be engaged with the bolt 87 when the gangs are in transversely aligned transport position.

To angle the gangs from transport to operating position, the tractor is backed against the tongue 52, pushing the forward section 51 rearwardly and at the same time the rope 98 is pulled to lift the notch 108 out of engagement with the bolt 87, to permit the carriage 76 to slide forwardly on the tongue section 51 as the outer ends of the gangs are pushed rearwardly relative to the frame. When the angle of the gangs is adjusted to the desired degree, the rope 98 is released, thereby allowing the bar 86 to drop, engaging one of the notches 107 with the bolt 87. To return the harrow to transport position, the tractor is driven forwardly when the rope 98 is pulled to disengage the notch 107 from the bolt 87, and as the carriage 76 slides rearwardly, the bar 86 is released to engage the notch 108 with the bolt 87, thereby holding the gangs in transversely aligned transport position.

Figure 2:
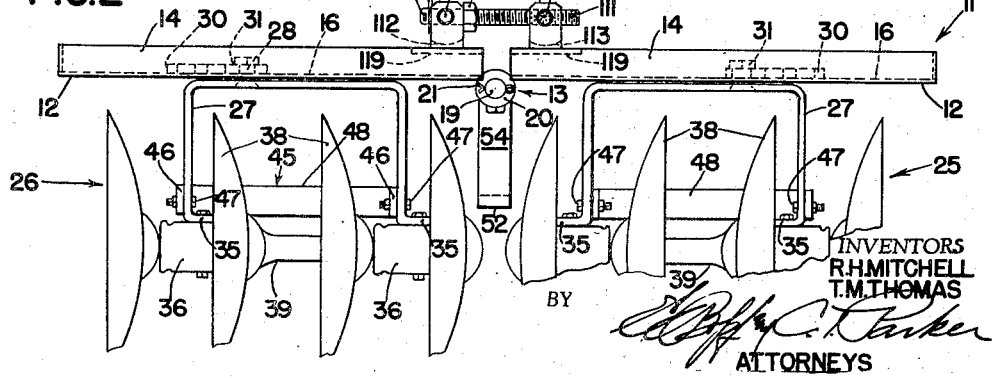
Figure 2 is a rear elevational view of the harrow showing the gangs in transport position with the gang frames in transverse alignment.

The vertical angle between the right and left sections 12 of the frame 11, is adjusted by means of a device indicated in its entirety by reference numeral 110, shown in Figures 1, 2, 3, 5 and 6. The adjusting device 110 comprises a threaded shaft 111 extending through a pair of trunnion blocks 112, 113. One end of the shaft 111 is journaled in the trunnion block 112 and is freely rotatable therein, axial movement of the shaft relative to the block 112 being restrained by means of a nut 114 threaded on the shaft 111 inwardly of the block 112, while a washer 115 and a cotter pin 116 are secured to the end of the shaft on the outer side of the block 112. The nut 114 is fixed, as by welding, to the shaft to permit the latter to be rotated by a wrench engaging the nut 114. The opposite end of the threaded shaft 111 is threaded into the trunnion block 113, which has cooperative internal threads, so that by rotating the shaft 111 in one direction the two trunnion blocks 112, 113 are drawn together, while rotation of the threaded shaft 111 in the opposite direction causes the trunnion blocks 112, 113 to be forced apart. Each of the trunnion blocks 112, 113 is provided with oppositely extending trunnions 117, by means of which the blocks are each rockably supported in a pair of spaced brackets or lugs 118, the latter being fixed, as by welding, to a supporting plate 119. The two plates 119 are positioned longitudinally of the harrow across the adjacent inner ends of the two frame sections 12 and are welded to the upper edges of the vertical flanges of the frame members 14. Thus, the threaded shaft 111 is positioned transversely above and perpendicular to the axis of the hinge 13, so that rotation of the shaft 111, by shifting the trunnion blocks toward or away from each other, angles the two frame sections about the fore and aft axis of the hinge 13. In Figure 2, the frame sections are shown in transport position, which is also the position in which the frame sections are set when the harrow is used for ordinary tillage operations. In this position of the frame sections, the axes of the gangs are always in a generally horizontal plane either during transport or during ground working operation. When the harrow is used to form ditches, the threaded shaft 111 is adjusted to draw the two trunnion blocks 112, 113 toward each other, thereby raising the outer ends of the frame sections and placing the axes of the gangs in an upwardly and outwardly inclined position in which the inner disks are appreciably lower than the outer disks.

On the other hand, when it is desired to form ridges, borders or beds, the shaft 111 is adjusted to force the trunnion blocks 112, 113 outwardly, thereby raising the inner ends of the frame sections and depressing the outer ends of the frame sections 12. With this operation, however, the disk gangs are reversed to the position shown in Figure 3, and with the axes of the gangs sloping downwardly and outwardly, the disks throw the soil inwardly and form the ridge or border. As mentioned before, the width of the ridge or border can be adjusted by shifting the gang pivots 28 from one hole 29 to another to obtain the desired width of ridge.

Figure 4 illustrates a modified form of the frame adjusting mechanism, indicated by reference numeral 119'. This device comprises a pair of plates 125, 126 disposed in overlapping relation and slidable relative to each other, one of the plates 125 being rigidly fixed, as by welding, to the left hand frame section 12 and the other plate 126 being rigidly fixed, as by welding, to the right hand frame section 12. The frame sections are secured in angularly adjusted position by means of a bolt 127 extending through a pair of aligned apertures in the two plates 125, 126. A plurality of bolt-receiving apertures 128 is provided in at least one of the plates 125, 126 spaced equidistant from the axis of the hinge 13 and adapted to be aligned in various angular positions, with one or more apertures in the other plate 125.

We do not intend our invention to be limited to the exact details shown and described herein, except as set forth in the claims which follow.

We claim:

1. In a disk harrow, a transverse frame, which is rigid with respect to horizontally applied forces, a pair of laterally spaced gangs, means connecting said gangs to said frame providing for horizontal angling movement of said gangs, a forwardly extending tongue connected to said frame and comprising a pair of telescopically related forward and rear sections, a carriage slidable longitudinally on said tongue, a pair of draft links pivoted near the inner ends of said gangs, respectively, a pair of draft links pivoted near the outer ends of said gangs, means pivotally connecting one of said pairs of links at their forward ends on the forward tongue section, means pivotally connecting the other pair of links at their forward ends on said carriage, and means for adjustably fixing said carriage to said forward tongue section in several longitudinally spaced positions relative thereto.

2. In a disk harrow, a transverse frame comprising a pair of transversely aligned sections and hinge means connecting the same, providing for relative vertical angular movement about a fore and aft extending axis but preventing relative horizontal angular movement, a pair of laterally spaced gangs, means pivotally connecting said gangs to said frame sections, respectively, providing for horizontal angling movement of the gangs, a forwardly extending tongue mounted on said frame and comprising a pair of telescopically related forward and rear sections, a carriage slidable longitudinally on said tongue, a pair of draft links pivoted near the inner ends of said gangs, respectively, a pair of draft links pivoted near the outer ends of said gangs, means pivotally connecting one of said pairs of links at their forward ends on the forward tongue section, means pivotally connecting the other pair of links at their forward ends on said carriage, and means for adjustably fixing said carriage to said forward tongue section in several longitudinally spaced positions relative thereto.

3. In a disk harrow, a transverse frame comprising a pair of transversely aligned sections hinged together at their inner ends by means including a longitudinally extending hinge pin providing for relative vertical angular movement but preventing relative horizontal angular movement, a pair of laterally spaced gangs, means pivotally connecting said gangs to said frame sections, respectively, providing for horizontal angling movement of the gangs, a forwardly extending tongue mounted on said hinge pin and comprising a pair of telescopically related forward and rear sections, a carriage slidable longitudinally on said tongue, a pair of draft links pivoted near the inner ends of said gangs, respectively, a pair of draft links pivoted near the outer ends of said gangs, means pivotally connecting one of said pairs of links at their forward ends on the forward tongue section, means pivotally connecting the other pair of links at their forward ends on said carriage, and means for adjustably fixing said carriage to said forward tongue section in several longitudinally spaced positions relative thereto.

4. In a disk harrow, a transverse frame comprising a pair of transversely aligned sections and hinge means connecting the same, providing for relative vertical angular movement about a fore and aft extending axis, a pair of laterally spaced gangs, means pivotally connecting said gangs to said frame sections, respectively, providing for horizontal angling movement of the gangs, said pivot means being laterally shiftable relative to said frame sections to adjust the spacing between said gangs, a forwardly extending tongue mounted on said frame and comprising a pair of telescopically related forward and rear sections, a carriage slidable longitudinally on said tongue, a pair of draft links pivoted near the inner ends of said gangs, respectively, a pair of draft links pivoted near the outer ends of said gangs, means pivotally connecting one of said pairs of links at their forward ends on the forward tongue section, means pivotally connecting the other pair of links at their forward ends on said carriage, and means for adjustably fixing said carriage to said forward tongue section in several longitudinally spaced positions relative thereto.

5. In a disk harrow, a transverse frame comprising a pair of transversely aligned sections and hinge means connecting the same, providing for relative vertical angular movement about a fore and aft extending axis, a pair of laterally spaced gangs, means pivotally connecting said gangs to said frame sections, respectively, providing for horizontal angling movement of the gangs, a forwardly extending tongue mounted on said frame and comprising a pair of telescopically related forward and rear sections, a carriage slidable longitudinally on said tongue, a pair of draft links pivoted near the inner ends of said gangs, respectively, a pair of draft links pivoted near the outer ends of said gangs, means pivotally connecting one of said pairs of links at their forward ends on the forward tongue section, means pivotally connecting the other pair of links at their forward ends on said carriage, means for adjustably fixing said carriage to said forward tongue section in several longitudinally spaced positions relative thereto, and a threaded shaft spaced vertically of said hinge means and engaging parts on said frame sections for adjustably fixing said sections in adjusted position.

6. In a disk harrow, a transverse frame comprising a pair of transversely aligned sections and hinge means connecting the same, providing for relative vertical angular movement about a fore and aft extending axis, a pair of laterally spaced gangs, means pivotally connecting said gangs to said frame sections, respectively, providing for horizontal angling movement of the gangs, a forwardly extending tongue mounted on said frame and comprising a pair of telescopically related forward and rear sections, a carriage slidable longitudinally on said tongue, a pair of draft links pivoted near the inner ends of said gangs, respectively, a pair of draft links pivoted near the outer ends of said gangs, means pivotally connecting one of said pairs of links at their forward ends on the forward tongue section, means pivotally connecting the other pair of links at their forward ends on said carriage, means for adjustably fixing said carriage to said forward tongue section in several longitudinally spaced positions relative thereto, and a pair of overlapping plates extending vertically of said hinge means and fixed to said frame sections, respectively, said plates having aligned apertures in several positions of adjustment of said frame sections and adapted to receive bolt means to fix said sections in adjusted position.

7. In a disk harrow, a transverse frame comprising a pair of transversely aligned sections and hinge means connecting the same, providing for relative vertical angular movement about a fore and aft extending axis, a pair of laterally spaced gangs of concavo-convex ground working disks, means pivotally connecting said gangs to said frame sections, respectively, providing for horizontal angling movement of the gangs, said pivot means being removable to permit interchanging said gangs to provide for throwing soil either inwardly toward or outwardly from the center of the harrow, a forwardly extending tongue mounted on said frame and comprising a pair of telescopically related forward and rear sections, a carriage slidable longitudinally on said tongue, a pair of draft links pivoted near the inner ends of said gangs, respectively, a pair of draft links pivoted near the outer ends of said gangs, means pivotally connecting one of said pairs of links at their forward ends on the forward tongue section, means pivotally connecting the other pair of links at their forward ends on said carriage, and means for adjustably fixing said carriage to said forward tongue section in several longitudinally spaced positions relative thereto.

8. In a disk harrow, a transverse frame comprising a pair of transversely aligned sections and hinge means connecting the same, providing for relative vertical angular movement about a fore and aft extending axis, a pair of laterally spaced gangs of concavo-convex ground working disks, means pivotally connecting said gangs to said frame sections, respectively, providing for horizontal angling movement of the gangs, said pivot means being removable to permit interchanging said gangs to provide for throwing soil either inwardly toward or outwardly from the center of the harrow, a forwardly extending tongue mounted on said frame and comprising a pair of telescopically related forward and rear sections, a carriage slidable longitudinally on said tongue, a pair of draft links pivoted near the inner ends of said gangs, respectively, a pair of draft links pivoted near the outer ends of said gangs, means pivotally connecting one of said pairs of links at their forward ends on the forward tongue section, means pivotally connecting the other pair of links at their forward ends on said carriage, and means for adjustably fixing said carriage to said forward tongue section in several longitudinally spaced positions relative thereto including a notched bar adapted to be pivotally mounted on said carriage and engageable with a cooperative locking element on said forward tongue section when said gangs are positioned to throw the soil in one direction and pivotally mounted on said forward tongue section and engageable with a cooperative locking element on said carriage when said gangs are interchanged to throw the soil in the opposite direction relative to the center of the harrow.

9. In a disk harrow, a transverse frame comprising a pair of transversely aligned sections and hinge means connecting the same, providing for relative vertical angular movement about a fore and aft extending axis but preventing relative horizontal angular movement, a pair of laterally spaced gangs, means pivotally connecting said gangs to said frame sections, respectively, providing for horizontal angling movement of the gangs, a forwardly extending tongue mounted on said frame and comprising a pair of telescopically related forward and rear sections, a carriage slidable longitudinally on said tongue, a pair of draft links pivoted near the inner ends of said gangs, respectively, a pair of draft links pivoted near the outer ends of said gangs, means pivotally connecting one of said pairs of links at their forward ends on the forward tongue section, means pivotally connecting the other pair of links at their forward ends on said carriage, means for adjustably fixing said carriage to said forward tongue section in several longitudinally spaced positions relative thereto, and means spaced vertically of said hinge means and engaging parts on said frame sections for adjustably fixing said sections in adjusted position.

ROLLIE H. MITCHELL.
THOMAS M. THOMAS.